3,171,513
HYDRODYNAMIC RETARDER
James B. Black and Marvin W. Dundore, Rockford, Ill., assignors to Twin Disc Clutch Company, Racine, Wis., a corporation of Wisconsin
Filed Jan. 24, 1963, Ser. No. 253,726
5 Claims. (Cl. 188—90)

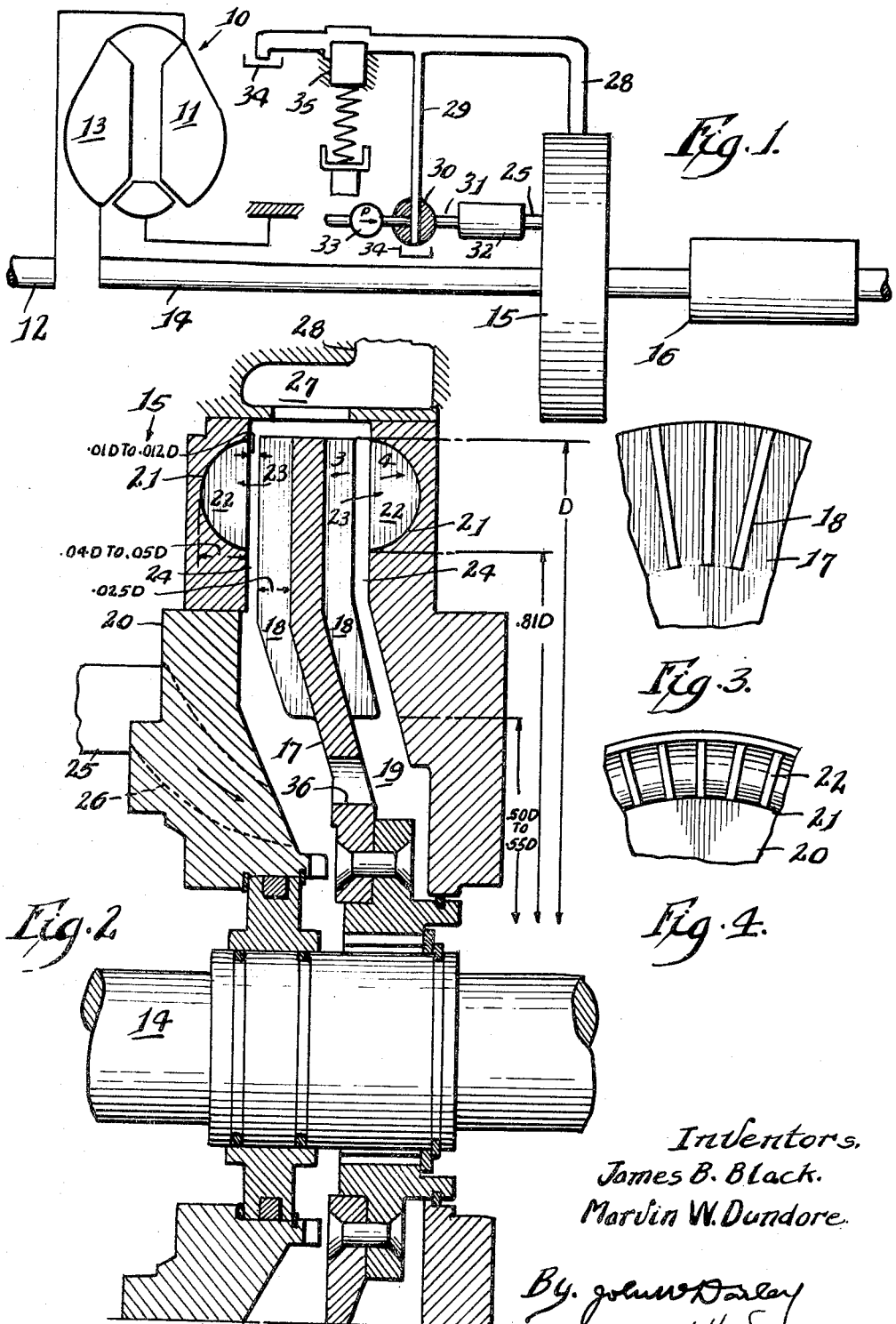

Our invention relates to an hydrodynamic retarder for effecting a controlled braking of an associated shaft as required.

For purpose of disclosure, the retarder will be described in connection with a vehicle power train which otherwise includes an hydraulic torque converter and a change gear transmission, but the broad utility of the retarder is not so limited. It is capable of use with any shaft which requires braking from time to time including a shaft connected to a falling load.

The present retarder utilizes known structure, generally speaking, and insofar as it comprises a bladed rotor attached to the shaft to be controlled and which is operable between bladed stators carried by a stationary housing that is supplied with oil or other suitable liquid under braking conditions. When in operation, not only is adequate braking torque at various rotor speeds a basic requirement, but since all of the kinetic energy in the oil is transformed into heat, this heat must be dissipated in a cooler before being returned to the retarder, this process being continuous during the braking action so that the quantity of oil circulated is substantial. For example, in a retarder that absorbs 1000 pds. ft. of torque at a rotor speed of 2000 r.p.m., the cooling requirement is of the order of 381 horsepower. The bladed rotor is characterized by inherent pumping capacity, but if this capacity is low in relation to the required cooling flow, either an additional pump facility is necessary which would reduce the overall efficiency of the system or, if the retarder forms part of a power train including an hydraulic torque converter or hydraulic coupling and a gear transmission including hydraulically actuated clutches, the conventional engine driven pump which services the hydraulic system comprising such components must be oversize.

It is therefore one object of the invention to provide an hydrodynamic retarder in which the required torque capacity is secured by a novel establishment of a mass flow of the working oil therethrough.

A further object is the provision of a retarder of the character indicated in which the bladed rotor is shaped and arranged to secure by its pumping action a rise in the pressure of the working oil from the inner to the outer diameter of the rotor sufficient to propel the oil being discharged through a cooling system.

A further object is to devise a retarder as set forth which is characterized by a minimum fill time of the region in which the braking torque is developed to thereby provide for quick braking response by the retarder.

In the drawing:
FIG. 1 is a schematic showing of a power train incorporating the retarder in relation to an hydraulic torque converter and gear transmission.
FIG. 2 is an enlarged, fragmentary, sectional elevation of the retarder.
FIGS. 3 and 4 are fragmentary, reduced elevations of the rotor and one of the two identical stators as viewed in the directions of the arrows 3 and 4, respectively, in FIG. 2.

Referring to FIG. 1, there is shown a schematic illustration of a power train including an hydraulic torque converter 10 whose impeller 11 connects through an input shaft 12 with a power source, such as an engine (not shown), and whose turbine 13 connects with a shaft 14 that extends through and is connected to the rotor, as presently described, of an hydrodynamic retarder 15, the shaft 14 continuing beyond the retarder 15 to serve as the input for a conventional gear transmission 16. The foregoing is merely intended to show by way of example a typical utilization of the retarder 15, since the latter may be employed with any shaft that periodically requires braking.

Referring to FIG. 2 which shows the internal construction of the retarder 15, an annular rotor 17 encircles and has driven connection with the turbine shaft 14. Extending from opposite sides of the rotor 17 and equispaced therearound is a plurality of radial blades 18, the latter extending from the periphery of the rotor 17 for a determined distance radially inward thereof for a purpose presently explained.

The rotor 17 operates in an annular chamber 19 included within a stationary, annular housing 20 that carries adjacent the peripheries thereof and of the rotor 17 annular grooves 21—21 that face opposite sides of the rotor 17, respectively, and are preferably parti-circular at any radial cross section of the housing 20. Positioned within each groove 21 is a plurality of radial, equispaced blades 22. Each set of blades 22 and the associated groove 21 define an annular stator 23 and the rotor 17 is arranged to freely rotate between the stators 23 with annular spaces 24—24 of determined width therebetween.

When the retarder 15 is in operation, a liquid, usually a suitable oil and so referred to hereinafter, is supplied through a pipe 25 and a passage 26 in the housing 20 to the chamber 19 radially inward of the rotor blades 18 and is forced outwardly between the stators 23—23 by the pumping action of the rotor 17 to an annular, collecting chamber 27 which connects with a discharge pipe 28.

The relationship of the rotor 17 to the stators 23, as shown in FIG. 2, is an important feature of the invention. The braking torque is exercised in the annular zone represented by the stators 23 and the cooperating bladed portions of the rotor 17. This torque is a product of the oil mass flow and the change in angular momentum, the latter being expressed as the change in the velocity of the oil and the radius at which this change occurs. From these considerations, it will be apparent that the desired torque can be secured by a large mass flow at a small radius, or relatively speaking, by a small mass flow at a large radius. Having regard to the overall requirements and specifically the desirability of quickly filling the retarder in the annular braking zone to insure fast braking response, and the utilization of the rotor as a pumping agency to substantially provide self circulation through an associated circuit including a cooler to remove the heat generated by the operation of the retarder, it has been ascertained that the small mass flow-large radius relationship provides the most desirable solution.

A structure meeting these requirement is shown in FIG. 2 wherein the stators 23 are wholly positioned adjacent the periphery of the housing 20 and function in conjunction with the portion of the rotor 17 immediately therebetween to establish a relatively small mass flow at a relatively large radius. Coincident therewith, the bladed portion of the rotor 17 extends for a substantial distance radially inward of the stators 23. Hence, as the rotor 17 turns, the blades 18 pick up the oil well inwardly of an move it outwardly between the stators 23 or delivery to the collecting chamber 27. This action of he rotor 17 substantially increases the oil pressure in he chamber 27 over that at the inner ends of the rotor lades 18.

The value of this high pressure rise characteristic of he rotor 17 may be readily understood by reference to FIG. 1 which shows, by way of example only, a suggested systemic relation of the retarder 15 to a cooler. As already noted, during operation of the retarder 15 substantially all of the kinetic energy in the oil is transformed into heat and to remove this heat, a large quantity of oil must be circulated through a cooler before being returned to the retarder 15.

In FIG. 1, the discharge pipe 28 is connectible successively through a pipe 29, a three-way valve 30, a pipe 31, and a cooler 32 with the pipe 25 leading to the retarder chamber 19. A suitably driven pump 33, connected to an oil source (not shown) has its output also connected to the three-way valve 30. When the latter valve is in the position shown in FIG. 1, the output of the pump 33 is delivered to a convenient sump 34 as well as any oil in the retarder 15 from a previous braking operation, the retarder 15 being empty when not working. When the valve 30 is rocked clockwise through an angle of 90°, the pump 33 connects through the cooler 32 with the retarder chamber 19 which fills quickly to establish the braking action and the rotor 17 in conjunction with the pump 33 establishes a recirculating flow through the valve 30 and cooler 32. The quick filling action is particularly important in the stator zone and the substantial pumping action of the rotor 17 enables the pump 33 to be sized relatively small. The braking action may be controlled by regulating the pressure in the pipe 28 through a manual or otherwise controllable valve 35, the pipe 28 connecting with the sump 34 beyond the regulating valve 35.

For the best performance of the retarder 15, certain criteria are recommended. The rotor 17 carries on each side 34 to 38 blades, while each stator 23 includes 40 to 44 blades. Sizing of the retarder 15 as to its major components can be established as follows: the outer diameters of the rotor 17 and stators 23 are D, the inner diameters of the stators 23 and of the inner, bladed portion of the rotor 17 are .81D and within the range of .50D to .55D, respectively, the radius of each stator transversely of the retarder 15 is within the range of .04D to .05D, the depth of each rotor blade 18 transversely of the retarder 15 is .025D, and the width of each annular space 24 between the rotor 17 and the stators 23 is within the range of .01D to .012D, the quantity D being expressed in inches. The depth of the rotor blades 18 never exceeds the depth of each stator 23. A plurality of apertures 36, only one of which is shown, is provided in the rotor 17 inward of the blades 18 to insure quick transfer of the entering oil to the portion of the chamber 19 on the right side of the rotor 17 as viewed in FIG. 2.

We claim:
1. An hydrodynamic retarder for exerting a braking torque on an associated shaft including an annular, stationary housing encircling the shaft and having opposed, annular, bladed stators positioned adjacent the periphery of the housing and defining an annular gap therebetween, a liquid supply opening located generally centrally of the housing, liquid discharge opening located in registering relation to the outer portion of the gap, and annular means coplanar with the gap arranged for connection to the shaft for rotation therewith and having on opposite sides thereof radial blades normally related to the annular means and defining therewith radially extending unobstructed pockets for trapping the liquid supplied to the housing and raising the pressure of the liquid discharged to the gap, the outer radii of the stators and annular means being identical and the depth of the annular means blades not exceeding the depth of each stator the pocket portions of the annual means extending radially inward of the stators for a distance substantially one and one-half times the radial width of the stators and terminating radially outward at the periphery of the annular means.

2. An hydrodynamic retarder comprising a rotor having radial blades extending laterally from opposite sides thereof to provide unobstructed, radial pockets and arranged for connection to a shaft to be braked, an annular, stationary housing enclosing the rotor and having a liquid supply opening located in the radially inner portion of the housing and a liquid discharge opening located in registering relation to the periphery of the rotor, and annular, bladed, equi-sized stators carried by the housing on opposite sides of and in symmerical relation to the rotor, respectively, the outer radii of the stators and rotor including the rotor blades being identical and the depth of the rotor blades not exceeding the depth of each stator, the inner radius of the stators being substantially greater than the inner radius of the bladed portion of the rotor by an amount approximately one and one-half times the radial width of the stators.

3. A combination as defined in claim 1 wherein infinitely controllable means is provided for varying the liquid pressure in the discharge opening to vary the braking torque.

4. A combination as defined in claim 2 wherein infinitely controllable means is provided for varying the liquid pressure in the discharge opening to vary the breaking torque.

5. A combination as defined in claim 2 wherein each stator is parti-circular at any radial cross section thereof.

References Cited in the file of this patent
UNITED STATES PATENTS

| | | |
|---|---|---|
| 2,350,933 | Schmidt | June 6, 1944 |
| 2,496,497 | Russell | Feb. 7, 1950 |
| 2,790,518 | Wilson | Apr. 30, 1957 |
| 2,827,989 | Christenson | Mar. 25, 1958 |
| 3,051,273 | Cordiano et al. | Aug. 28, 1962 |